INVENTOR
Raymond M. Wilmotte
BY Paris, Haskell & Levine
ATTORNEYS

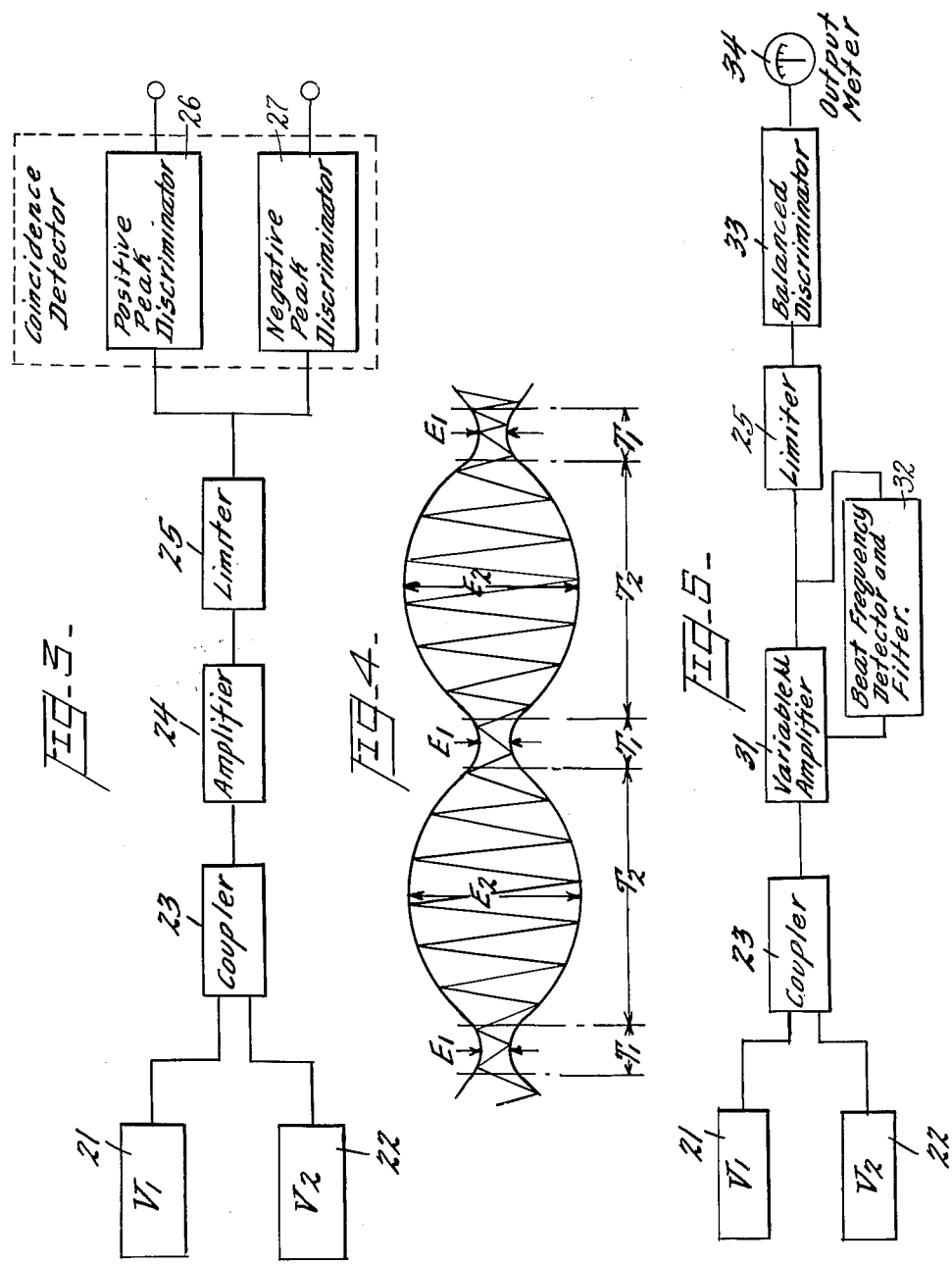

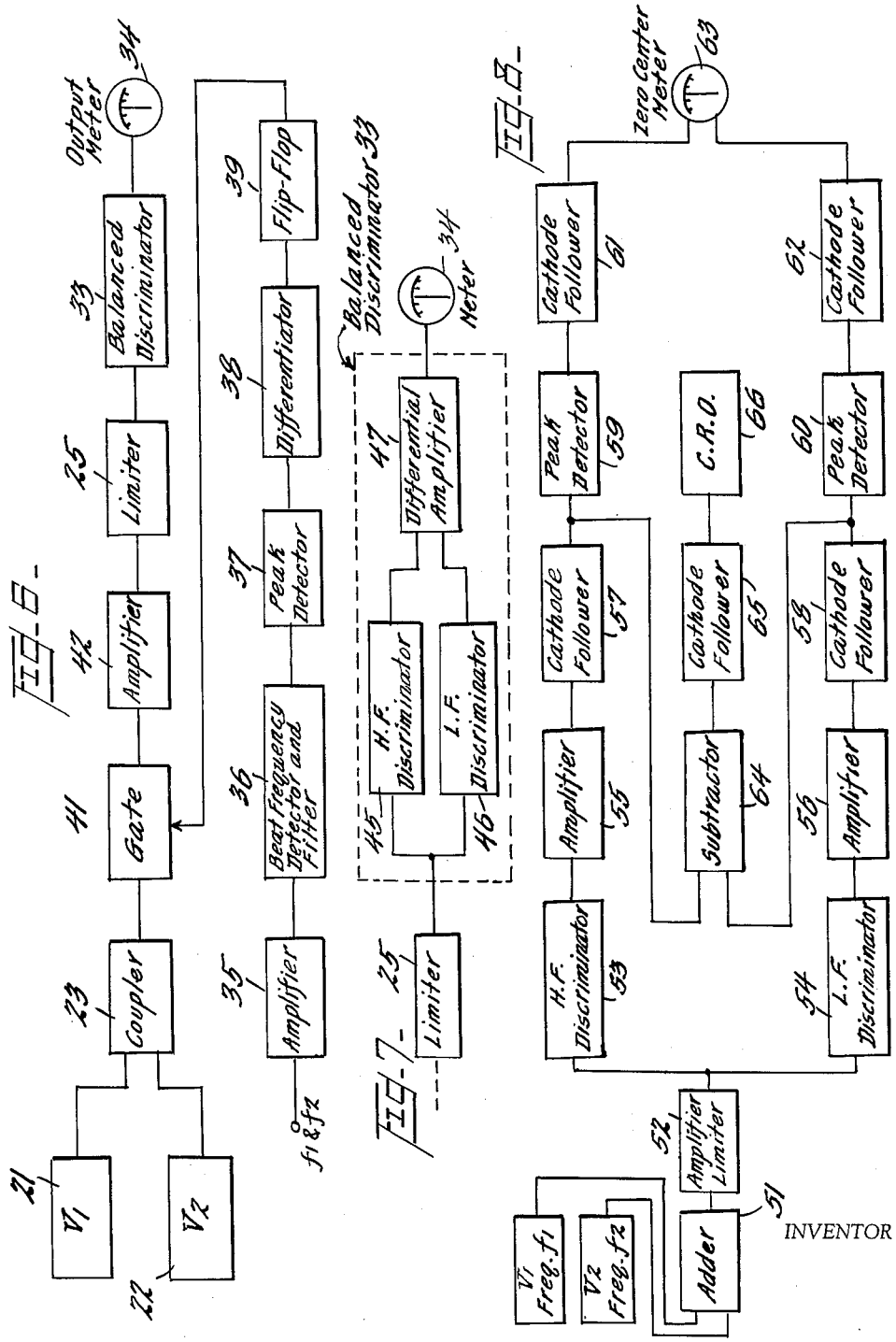

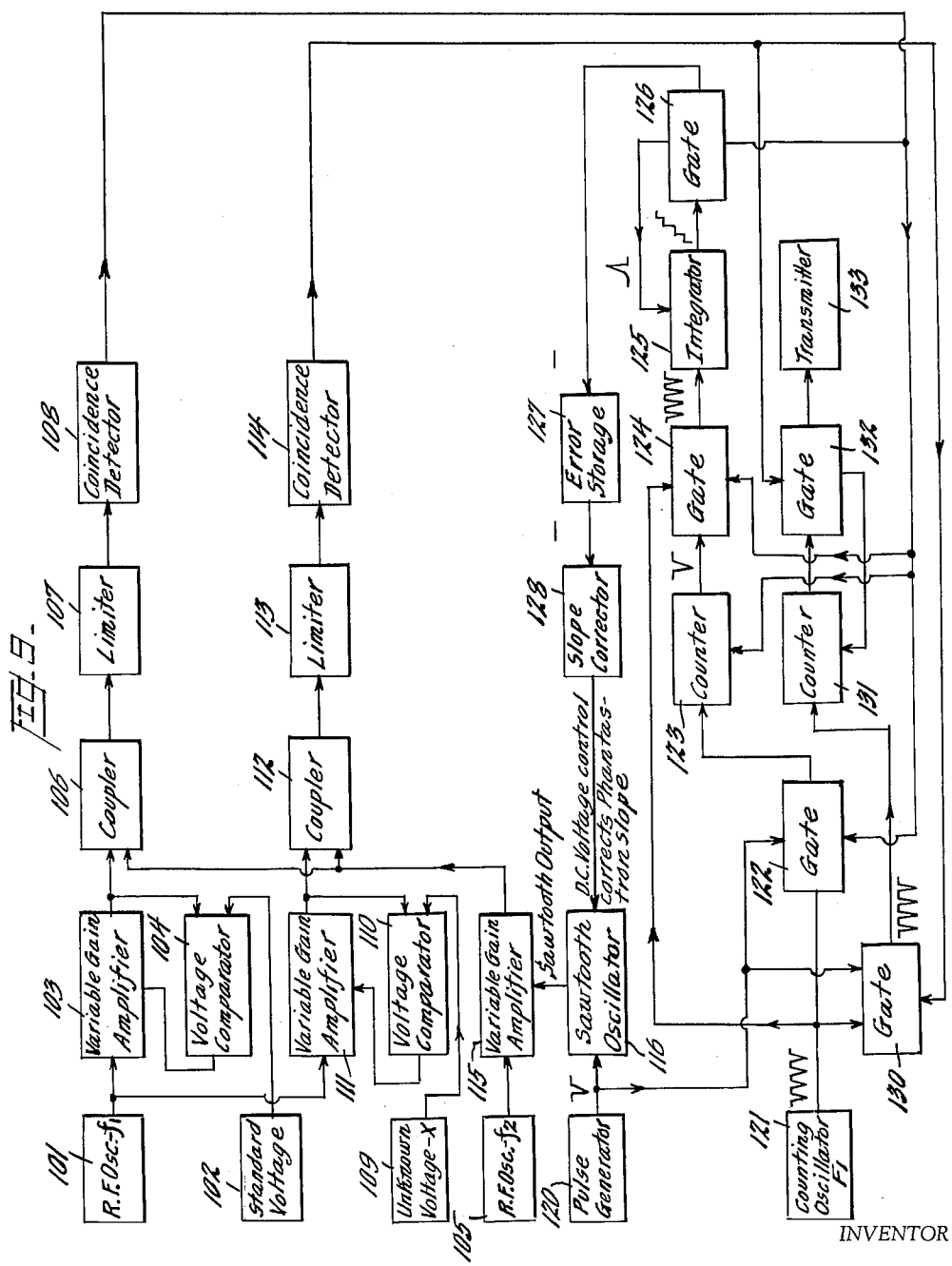

(a) Rate of change of phase in output of each channel for vectors of Fig. 11.

Channel 1 -----
Channel 2 ———

United States Patent Office
3,219,928
Patented Nov. 23, 1965

3,219,928
MEASURING SYSTEM FOR COMPARING UN-
KNOWN AND REFERENCE A.C. SIGNALS
AND DETECTING RATE OF CHANGE OF
PHASE OF RESULTANT
Raymond M. Wilmotte, Princeton, N.J.
(4301 Massachusetts Ave. NW., Washington, D.C.)
Filed May 27, 1960, Ser. No. 32,307
28 Claims. (Cl. 324—99)

The present invention relates to the accurate measurement of voltages, and to the encoding of such measurements in digital form.

Voltage measurements in accordance with the present invention are obtained, basically, by comparison of the unknown voltage with a reference voltage. In particular, the reference voltage is varied from a selected value differing from the unknown voltage in a direction toward the value of the unknown voltage, and continuing past the value of the unknown voltage. For example, the reference voltage may be increased from a selected value less than that of the unknown voltage to a value in excess of the latter. The variations in the reference voltage value are accomplished in accordance with a known function, preferably a linear function; and thus the time lapse required for the reference voltage to change from the selected starting value to equality with the unknown voltage becomes a measure of the value of the unknown voltage. By gating a pulse generating circuit of accurate and stable frequency over the stated time lapse, the number of pulses passed then becomes a measure of the unknown voltage in digital terms.

An important feature of the present invention is obtaining an accurate, distinct, and easily detected indication of the attainment of equality between the reference and unknown voltages. In conventional circuits for detecting the attainment of equality between two voltages, such as coincidence circuits, bridge circuits, or other balanced systems, as the two voltages pass each other in amplitude, the output gradually changes from a negative value, through zero, to a positive value. Such gradual transition is not sharp and easy to detect with a high degree of accuracy. In accordance with the present invention, however, as equality of the two voltages is gradually approached and passed, an output is obtained which gradually increases to a large value of one sign as equality is approached, and suddenly changes to a large value of opposite sign as equality is passed, and then gradually decreases as the voltage values move away from equality. The critical point sought, i.e. equality of the voltage values, is therefore very clearly and sharply defined since it lies between two large values, one positive and the other negative. Sensitive equipment for the accurate detection of equality is thus not required. Furthermore, high accuracy can be obtained without the production of high voltages, and throughout the system high impedances can be maintained so that the power requirements are small.

In accordance with the present invention, measurement of equality between the reference and unknown voltages is obtained by utilizing A.C. signals for both voltages having different frequencies, combining the two signals, limiting the amplitude of the resultant of the combined signals to a uniform value, and measuring the rate of change of phase of this resultant signal as by means of a phase discriminator. As will be shown subsequently, when the amplitude of the reference voltage is increased linearly with time and is combined with the unknown voltage of constant amplitude, as the amplitudes of these voltages approach equality, a peaky waveform is obtained out of the discriminator, the spikes of which become extremely large in one direction, e.g. negative. As the amplitudes of these two voltages pass each other, the direction of these large spikes is reversed, e.g. to positive. This abrupt change from a large amplitude waveform in one direction, to a large amplitude waveform in the reverse direction as the two voltage signals pass through equality, makes exact detection of equality of the two voltages very easy and accurate.

It is accordingly one object of the present invention to provide for the accurate detection of equality between two A.C. voltages of different frequencies.

Another object of the present invention is to provide for the accurate detection of equality between two A.C. voltage signals of different frequencies, by measuring the rate of change of phase of the resultant signal obtained from combining the two signals.

Another object of the present invention is to provide for the encoding of the voltage value of a signal in digital terms.

Another object of the present invention is to provide for the measurement of the voltage value of a signal and the encoding of the measured value in digital terms.

Still another object of the present invention is to provide for the comparison of an unknown A.C. voltage signal with a reference A.C. signal caused to vary in voltage value in accordance with a prescribed function, detecting the occurrence of equality between the voltages of the two signals, measuring the time lapse between a reference time and the time of said occurrence of equality, and representing said time lapse in terms of a number of pulses as a designation of the value of the unknown voltage.

And a still further object of the present invention is to provide for said designation of the value of the unknown voltage, wherein the occurrence of equality between the unknown and reference signal voltages is effected by measurement of the rate of change of phase of the resultant obtained by combining the two signals, relative to one of the two signals.

Other objects and advantages of the present invention will become apparent to those skilled in the art from a consideration of the following exemplary detailed description of the invention, had in conjunction with the accompanying drawings, in which like reference characters refer to like or corresponding parts, and wherein:

FIG. 3 is a functional block diagram of a circuit for detecting equality of the two voltage signals depicted in FIGS. 1 and 2a;

FIG. 4 is a diagram of the waveform of the resultant signal from addition of two A.C. signals of different frequencies, where the voltages thereof are nearly equal;

FIG. 5 is a block diagram of a modification of the circuit of FIG. 3;

FIG. 6 is a block diagram of another modification of the circuit of FIG. 3;

FIG. 7 is a block diagram of a modification of a portion of the circuit of FIG. 3;

FIG. 8 is a block diagram of still another form of the circuit illustrated in FIG. 3;

FIG. 9 is a block diagram of a system for utilizing the voltage equality detecting circuit of FIG. 3 in accurately measuring the voltage value of an unknown signal and encoding this value in digital form;

Figure 12:
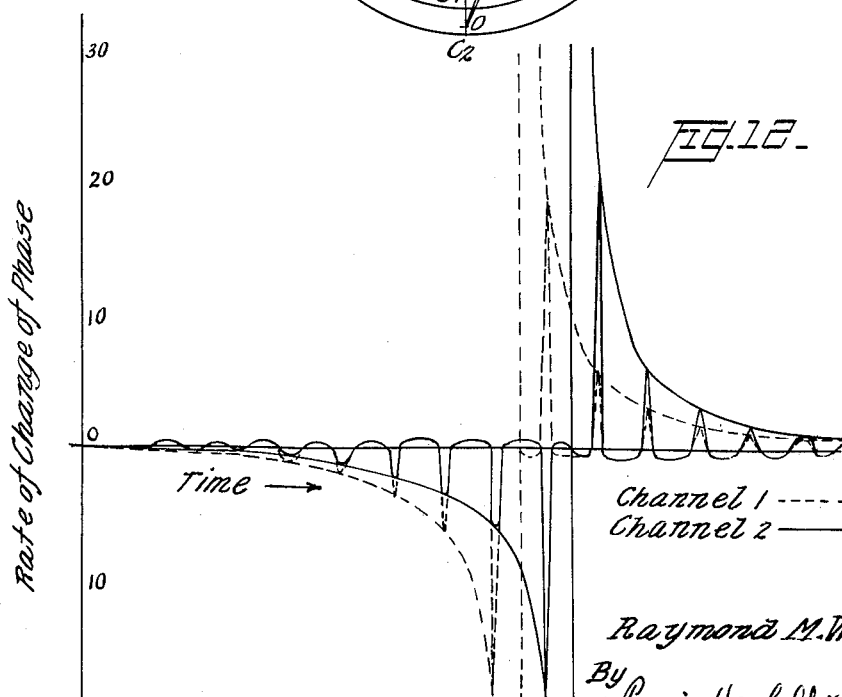
FIG. 12 is a plot of the rate of change of phase against time of the resultant signals in each of the channels of FIG. 10.
Figure 13:
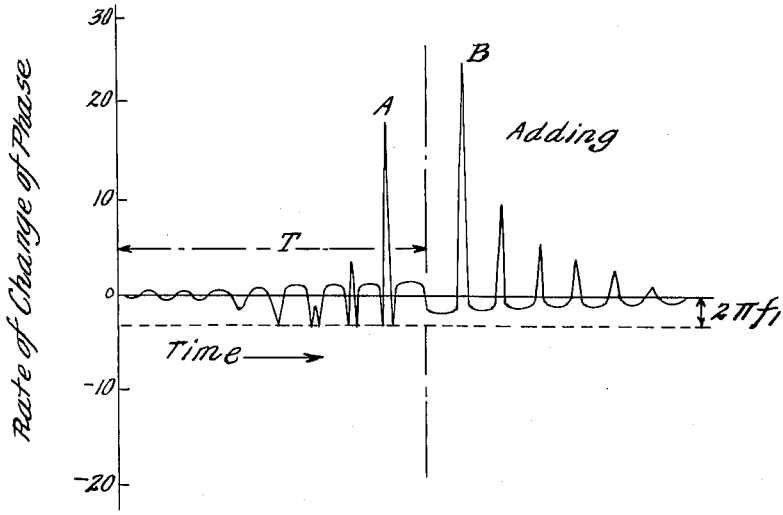
Figure 14:
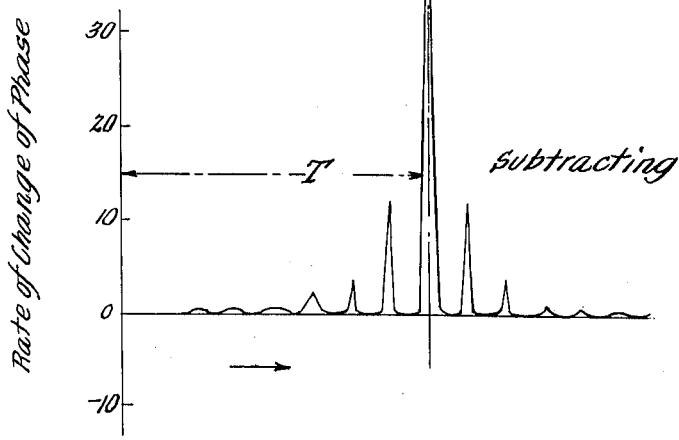

FIG. 13 is a plot of the rate of change of phase against time of the resultant of the signals in the two channels plotted in FIG. 12 when combined by adding the signals of one channel to the other; and FIG. 14 is a plot of the rate of change of phase against time of the resultant of the signals in the two channels plotted in FIG. 12 when combined by subtracting the signals of one channel from the other.

As previously indicated, one feature of the present invention resides in obtaining an accurate and readily detectable occurrence of equality of voltage between two A.C. signals of different frequencies.

Figure 1:
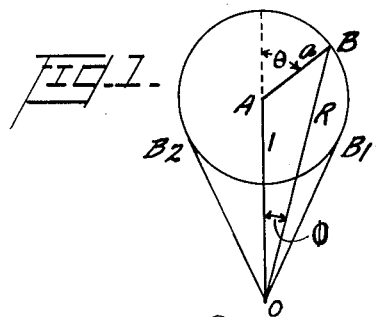
FIG. 1 is a vector diagram of two summed A.C. voltage signals of different frequency.

FIG. 1 shows a vector diagram of two such signals. OA is the vector for one signal and AB is that for the other. Vector AB rotates relative to vector OA at an angular velocity corresponding to the difference in frequency between the two signals. The resultant voltage is OB and it rotates at an average frequency rate of the first signal OA, that is, the frequency of the largest voltage. While it is so rotating it swings in phase through angle $\phi$ from the direction $OB_1$ to the direction $OB_2$. Taking the amplitude of the first signal voltage as unity and that of the second as $a$, it is possible to calculate the value of R as the angle $\theta$ changes. If the combined voltages are passed through a limiter, the amplitude becomes constant but the change of phase $\phi$ remains unaltered. If the output of the limiter is passed through a discriminator, the output of the discriminator will be proportional to the rate of change of phase $$\frac{d\phi}{dt}$$

of the resultant R. That rate of change of phase will include not only the basic frequency of the voltage represented by the vector OA, which is constant, but in addition the rate of change of phase due to the fact that the resultant R changes its phase as it moves back and forth between positions $OB_1$ and $OB_2$. This rate of change of phase can readily be calculated and in fact can be written down by direct examination of FIGURE 1, for the two conditions when $\theta=0$ and $\theta=\pi$.

When $\theta=0$ $$R = 1 + a \qquad (1)$$

If $f$ is the frequency difference between the two voltages represented by the two vectors OA and AB, and $f_1$ is the frequency of OA, and $\phi$ is the phase angle of R, then the total rate of change of phase of the vector R is $$2\pi f_1 + \frac{d\phi}{dt}\bigg|_{\theta=0} = 2\pi f_1 + \frac{2\pi f a}{1+a} \qquad (2)$$

When $\theta=\pi$, it can readily be seen that $$2\pi f_1 + \frac{d\phi}{dt}\bigg|_{\theta=\pi} = 2\pi f_1 + \frac{2\pi f a}{1-a} \qquad (3)$$

Figure 2A:
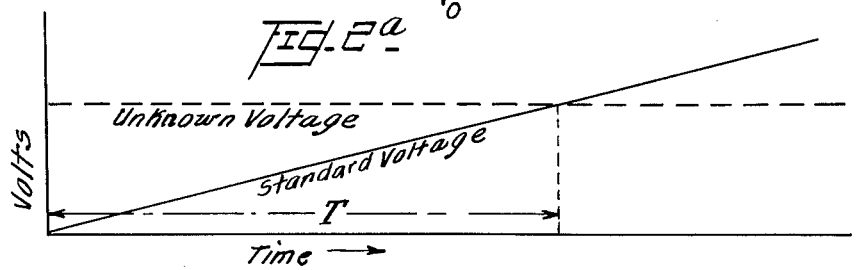
FIG. 2a is a time plot of an unknown and a reference A.C. voltage increasing in value.
Figure 2B:
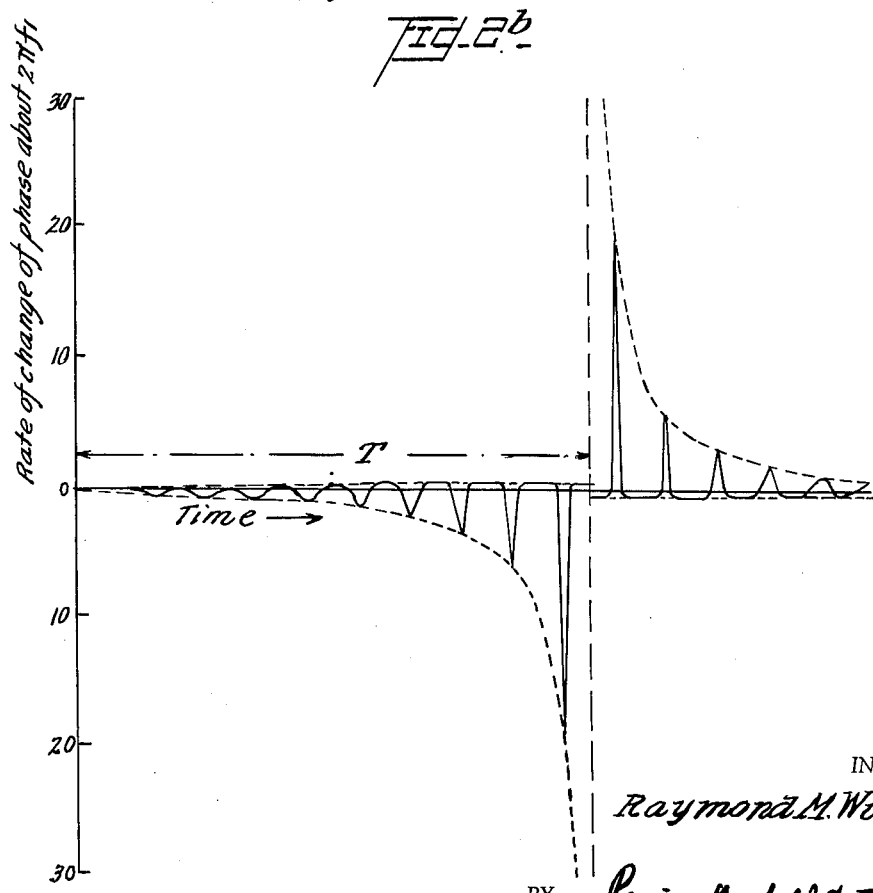
FIG. 2b is a plot of the rate of change of phase against time of a resultant signal obtained by adding the two voltages plotted in FIG. 2a, obtained as the output of a limiter into which said two voltages are fed.

The rate of change of phase, over and above $2\pi f_1$, is therefore relatively slow when $\theta=0$ and relatively fast when $\theta=\pi$. Also the rate of change of phase when $\theta=\pi$ becomes very large when $a$ approaches unity. The output of the discriminator will therefore have a curious waveform characteristic. It is depicted in FIG. 2b. There is shown in that diagram the rate of change of phase for the case of an alternating voltage which increases linearly in amplitude with time and is combined with an alternating voltage of a different frequency but which is constant in amplitude, as set forth in the graph of FIG. 2a. It will be seen that when the amplitude of the two voltages approach each other, the waveform out of the discriminator becomes extremely peaky, the spikes extending over a very great range, due to the fact that when $\theta=\pi$ the factor $a/(1-a)$ becomes very large as $a$ approaches unity. Theoretically, the spikes reach infinite amplitude when $a=1$. When $a$ is greater than 1, the direction of the spike is reversed. It is, therefore, very easy to detect exactly when the amplitudes of the two signals cross each other or pass through equality. It is this phenomenon which is used in the present invention for detecting equality of voltages.

Viewed in another way, the foregoing effect can be appreciated from a consideration of FIG. 1 by observing the change in phase angle $\phi$ as voltages AB and OA approach equality, or as the voltage $a$ approaches unity. As OA and AB approach equality from the relationship illustrated in FIG. 1, it is apparent that the phase angle $\phi$ becomes larger and larger, reaching a maximum when the voltages are equal. Since the phase angle becomes larger, the rate of change of phase $$\frac{d\phi}{dt}$$

must increase. When AB exceeds OA, the direction of phase angle $\phi$ reverses, thus accounting for the change in sign of the rate of change of phase.

In order to establish when the two voltages are equal, a circuit represented by the block diagram of FIG. 3 may be used. The two A.C. voltages $V_1$ and $V_2$ from sources 21 and 22 are added together by a coupling circuit 23 comprising only passive elements. The combined voltages are amplified at 24. This amplifier need not be stabilized, and all that is required of it is to amplify the voltages without deteriorating the waveform. It is not material how much amplification takes place. This feature is of importance because it indicates that the input voltages may be small and that the most sensitive instrument that can be designed on this basis is limited only by noise. The output of the amplifier 24 is fed into a limiter 25 and the output of the limiter is fed to two discriminators 26 and 27, one designed for the peaks spreading in one direction and the other for peaks in the other direction. When $V_1$ is smaller than $V_2$, pulses will appear at one output, and when $V_1$ is greater than $V_2$ they will appear at the other output. These pulses can then be used to control circuits to achieve a wide variety of results.

It is clear from the foregoing explanation that these pulses can be made extremely sharp so that there is no problem in making a measurement of time from some particular reference time until the appearance of the first pulse out of one of the peak discriminator outputs. It is also to be noted that the sharpest and highest pulses occur where it is most important to detect them, namely, immediately to either side of the point when the two voltages are equal. This result is in marked contrast to most measuring techniques in which the voltage that initiates the error detecting display gradually increases from zero as the error increases.

The positive-peak discriminator 26 and the negative-peak discriminator 27 may for convenience be referred to as a "coincidence detector" 28, for essentially the combined circuits can establish with a high degree of accuracy the condition of equality or coincidence between the two voltages $V_1$ and $V_2$.

The above analysis is based on the assumption that, while the vector AB of FIG. 1 rotates through a small angle, the vector OB of the resultant R goes through an appreciable number of cycles. That assumption implies that the beat frequency is small compared with the frequency of the two voltages that are being compared.

The foregoing description applies particularly to the situation where the frequencies of the voltages being compared are of high values. However, when these voltages are embodied in low frequency signals, certain difficulties are encountered. When the frequency of vector OA in FIG. 1 is $f_1$ and that of vector AB is $f_2$, the beat frequency $f$ is $(f_1-f_2)$. Assigning to the notation $n$ and $n^1$ the values of $a/(1-a)$ at the time of the first spike on either side of the coincidence point respectively, the rate of change of phase at these times, and before and after the coincidence point, may be written respectively in the form $$\frac{1}{2\pi}\frac{d\phi_1}{dt}=f_1+n(f_2-f_1) \qquad (4)$$

$$\frac{1}{2\pi}\frac{d\phi_2}{dt}=f_1-n^1(f_2-f_1) \qquad (5)$$

Equation 5 may lead to a negative value of rate of change of phase and, since, without special circuits a negative frequency is indistinguishable from a positive one, the difference between the spikes on either side of the coincidence point may not be marked so that the circuit of FIG. 3 will not operate as satisfactorily as if negative and positive frequencies could be distinguished.

Figure 10:
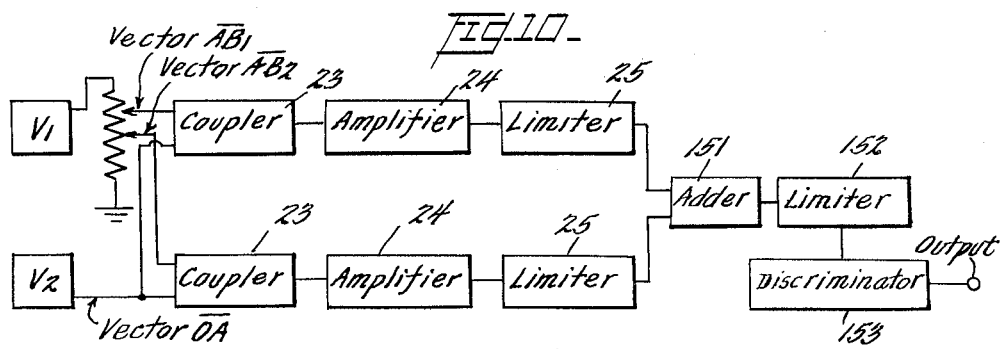
FIG. 10 is a functional block diagram of a modification of the basic circuit shown in FIG. 3 for detecting equality of two voltage signals.
Figure 11:
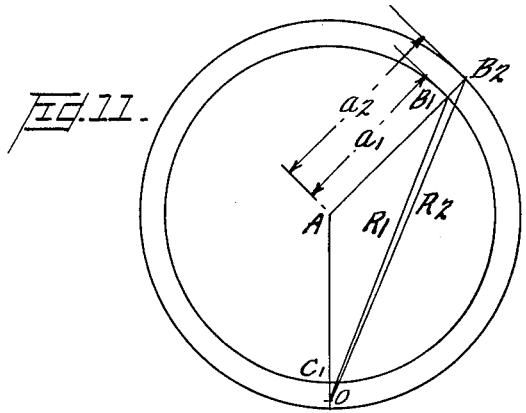
FIG. 11 is a vector diagram of the A.C. voltage signals applied to the circuit of FIG. 10.

This problem may be overcome by utilizing a circuit as indicated in FIG. 10 for detecting the occurrence of equality of voltage between signals $V_1$ of frequency $f_1$ and $V_2$ of frequency $f_2$. This circuit produces a characteristic similar to that depicted in FIG. 2b, of producing a very large change in the output as the voltage as the voltage passes through the critical value. FIG. 11 shows the basic vector diagram depicting the principle of operation of this circuit. The voltage $V_1$ represented by vector OA is combined with two nearly equal voltages represented by vectors $AB_1$ and $AB_2$ in separate channels, each comprising coupler 23, amplifier 24, and limiter 25 corresponding to these components in FIG. 3. These two nearly equal voltages, $AB_1$ and $AB_2$, are proportional to and obtained directly from $V_2$ by means of a potentiometer or the like. The later two voltages are of the same frequency $f_2$ and in phase. The vector diagram of FIG. 11 is drawn for the condition wherein the amplitude of OA lies between the amplitudes of $AB_1$ and $AB_2$. It will be seen that when $B_1$ and $B_2$ are close to $C_1$ and $C_2$, the rates of change of phase of the two resultants in the two channels are very large and opposite in sign, so that when OA is approximately equal to the arithmetic mean of $AB_1$ and $AB_2$, the rates of change of phase of these two resultants are nearly equal and opposite. When the two resultants are added together in adder 151, they combine to produce a single resultant the phase of which is the mean of the phases of its two components. At that instant the rate of change of phase of this single resultant is therefore nearly zero. It will have a large negative value immediately before and a large positive value immediately following the time that the point O lies between $C_1$ and $C_2$.

FIG. 12 illustrates this result in graphical form. This figure shows two curves for the rate of change of phase, both of them are similar to FIG. 2b. One of these curves, shown dotted, gives the rate of change of phase for the resultant $R_1$ of the vectors OA and $AB_1$. The other, shown solid, is the resultant $R_2$ of the vectors OA and $AB_2$. FIG. 13 illustrates the sum of these two resultants $R_1$ and $R_2$, and therefore represents the output of the limiter 152 and the discriminator 153 of FIG. 10, as the mean voltage of the standard or reference voltages $AB_1$ and $AB_2$ attains equality with the unknown voltage of signal OA. For the purpose of measuring the value of the voltage of signal OA, it is of course understood that the reference signals $AB_1$ and $AB_2$ would be varied in a manner as indicated in FIG. 2a, so that the time lapse from a given starting time to detection of equality between the mean voltage of $AB_1$ and $AB_2$ would thereby represent a measure of the voltage of the unknown signal OA. FIG. 14 also represents a corresponding output of the discriminator 153, as depicted in FIG. 13, but wherein a substractor is used in place of the adder 151 in FIG. 10. Both these curves of FIGS. 13 and 14 show that the condition for which the vector OA lies in between $AB_1$ and $AB_2$ in amplitude is very clearly indicated.

In order to simplify the explanation, the zero of the ordinate axis in FIGS. 2b, 12 and 13 were made equal to the rate of change phase of the vector OA, that is, $2\pi f_1$, so that no part of a spike actually becomes negative until it reaches a negative value in excess of $2\pi f_1$. In the case of FIG. 14, since it represents the difference of the two limiters of FIG. 10, the zero corresponds correctly to zero rate of change of phase so that all spikes appear on one side of the axis. The key characteristics of FIG. 13 are the two high spikes marked A and B with a space between them of much smaller or even zero spikes. This space of small spikes occurs when OA lies between $AB_1$ and $AB_2$, for in this space the spikes from the two channels oppose each other.

The key characteristic of FIG. 14 is a space with very large spikes, corresponding to the condition when OA lies between $AB_1$ and $AB_2$, for in this space the spikes from the two channels add. On either side of this space are much smaller spikes, for here the spikes of the two channels oppose one another.

FIGS. 12, 13 and 14 have been drawn for the condition in which the vectors are opposite to each other in phase when the OA is approximately the arithmetic mean of $V_1$ and $V_2$. Under other conditions a small spike will occur in FIG. 13 for the spikes from the two channels will not balance out exactly. The figures have also been drawn for the condition in which the period that the amplitude lies between the values $V_1$ and $V_2$ is one beat period. If this period is longer than one beat period, several small spikes will appear in FIG. 13 and several large spikes in FIG. 14.

As will be apparent to those skilled in the art, circuits can be readily designed to detect the condition when the signal being measured has an amplitude lying between those of frequency $f_2$ represented by vectors $AB_1$ and $AB_2$ of FIG. 11, using either the sum or the difference of the two channels embodied in the output of discriminator 153. If the sum is used (FIG. 13), the condition sought is ascertained by detecting a sudden decrease in the size of the spikes, and confirmed by the appearance immediately thereafter of very large spikes. If the difference is used (FIG. 14), the condition sought is ascertained by the recognition of a very large spike with much smaller spikes before and after.

Obviously, whether one channel is used as depicted in FIG. 3, or two channels as depicted in FIG. 10, the recognition of the spike or spikes that establish the condition of equality of amplitude of the voltages will depend on the selection of thresholds at the output of the discriminators to differentiate the critical spikes from adjacent spikes. The selection of this threshold will depend on the requirements of the system including values of $f_1$, $(f_2-f_1)$, the accuracy of measurement sought, the performance of the limiting circuits, the time available to make the measurement, etc. For reliable operation, it is desirable to design the system so that there is as large a difference as possible between the spikes to be recognized and adjacent ones. It has been shown that a major difference in operation occurs when a substantial portion of a spike becomes negative as explained in connection with Equation 5. The practical design of the system is therefore a compromise between making $(f_2-f_1)$ large and keeping the spikes always positive. If the system requires that a substantial part of a spike become negative, then a circuit such as that shown in FIG. 10 can be used. The time available for making the measurement also produces a limiting condition, for a spike occurs only once during a period of the beat frequency, so that during this period the amplitude must not have changed by an amount greater than the accuracy within which the voltages are to be compared.

The basic circuits for establishing when the two input voltages $V_1$ and $V_2$ are equal in amplitude have been described in connection with FIGS. 3 and 10. When the system is designed to be very accurate, certain problems develop. These will be described as they affect the design of the circuit of FIG. 3. From this description one familiar with the art will readily understand how they affect the design of the circuit of FIG. 10. The frequency spikes that come out of the limiter occur when the vectors of the two voltages which are being compared are opposite in phase, and the spikes are large when the amplitude of the voltages are nearly equal and the resultant is therefore very small. FIG. 4, which represents the envelope of the resultant waveform when $V_1$ and $V_2$ are added and the amplitudes are nearly equal, shows that the period marked $T_1$ of the waveform, when the vectors of the two voltages are nearly out of phase, is a small percentage of the total period. The technique used for detecting when the amplitudes are equal makes no use of the period marked $T_2$ when the vectors are in any other phase than close to 180° relative to each other. For the circuit to operate properly, it is therefore necessary to let the minimum voltage marked $E_1$ be strong enough for the limiter to operate effectively during the period $T_1$. If the instrument is designed to be able to detect small errors from perfect equality, it must operate effectively when the ratio of $E_2$ to $E_1$ is large. This ratio might be as large as 1000 to 1 or more. Under those conditions, when $E_1$ is amplified to be large enough for the limiter to operate effectively, $E_2$ may reach a value of many thousands of volts. The problem of handling such large voltages can be avoided since the only section that is of interest from the point of view of detecting the condition of equality of the voltages is the portion $T_1$ in FIG. 4. Two circuits for this purpose are indicated in FIGS 5 and 6, the first circuit utilizes a variable $\mu$ amplifier, and the second circuit utilizes a gating technique.

Referring to FIG. 5, the resultant of the combined voltages $V_1$ and $V_2$ as shown in the waveform of FIG. 4, is fed to amplifier 31 in which the amplifying stages use variable $\mu$ tubes. By means of a detecting circuit and appropriate filter 32, the beat frequency between the two input frequencies of $V_1$ and $V_2$ is obtained from the output of this amplifier 31 and fed back into the amplifier so that the amplifier will provide a large amplification during the portion $T_1$ of the waveform of FIG. 4 and little amplification during the portion $T_2$, with the result that the output over a full period of the beat frequency will be relatively constant and the ratio between the values of $E_2$ and $E_1$ of FIG. 4 at the output of amplifier 31 will not be large. Under these conditions it is possible to operate a limiter satisfactorily. The output of the limiter 25 may be fed into a balanced discriminator 33 instead of the coincidence detector 28 of FIG. 3, to obtain an output reading on meter 34, as will be explained below.

The gating circuit technique is illustrated in the block diagram of FIG. 6. In this system two input signals having frequencies $f_1$ and $f_2$ are fed into an amplifier 35, the two frequencies being obtained from the oscillators 21 and 22 generating the previously mentioned voltages $V_1$ and $V_2$. By means of a rectifier and filter, the beat frequency is obtained in beat frequency detector and filter 36. The period of time during which the beat frequency voltage exceeds a predetermined value is obtained by peak detector 37. These peaks are differentiated at 38, producing a series of positive and negative pairs of pulses, which, when fed into a flip-flop circuit 39, provide a sequence of similar positive and negative pulses. These pulses operate a gate 41 in series with the coupler 23 that is combining voltages $V_1$ and $V_2$, so that the gate is open only during the time of the peaks of the beat frequency. This time corresponds to the period marked $T_1$ in FIG. 4. The summed input signals $V_1$ and $V_2$ thus reach the amplifier 42 only during the periods $T_1$ designated in FIG. 4. This amplifier may provide a large gain to bring the low voltage that occurs during this period to a value which can be effectively limited at 25. The output of the limiter 25 is then fed to a balanced discriminator 33 to obtain an output reading on meter 34, as will be explained hereinafter.

In accordance with the previous discussion, as the voltages $V_1$ and $V_2$ being compared pass each other in amplitude, the frequency spikes out of the limiter 25 in FIGS. 3, 5, and 6 suddenly change from a high positive value to a high negative value about the mean frequency. In effect, positive spikes correspond to high frequencies and the negative spikes to low frequencies. The presence of the positive spikes can therefore be detected by means of a high frequency discriminator covering a narrow frequency band around a high frequency, and the presence of the negative spikes can be detected by means of a low frequency discriminator covering a narrow frequency band around a low frequency. Accordingly, as shown in FIG. 7, the balanced discriminator 33 of FIGS. 5 and 6 comprises the high frequency discriminator 45 and the low frequency discriminator 46 being fed by the output of limiter 25. The outputs of these two discriminators are then fed into differential amplifier 47 having a meter 34 or the like connected across its output. Thus, when a positive spike is present, the meter reads a positive value, and when a negative spike is present, the meter reads a negative value. As the amplitude of the two voltages $V_1$ and $V_2$ pass each other, the meter therefore changes its reading from a high positive reading to a high negative reading, providing a clearly defined indication of when the two voltages $V_1$ and $V_2$ pass the point of equality.

It is also possible to use a wide band discriminator with a push-pull output for the purpose of detecting equality between $V_1$ and $V_2$. As the signals $V_1$ and $V_2$ approach and pass each other, the output of such a discriminator gradually increases to a high positive value, rapidly drops to zero, rapidly rises to a large negative value, and thereafter gradually decreases toward zero. It is found that the condition for zero current between the strong positive and negative peaks is extremely sharp, and that the condition of zero output can be ascertained with an accuracy of one part in 10,000.

A more detailed block diagram of a balanced discriminator voltage equality or coincidence detector is shown in FIG. 8. The inputs are shown as $V_1$ and $V_2$ having frequencies $f_1$ and $f_2$, respectively. $V_1$ represents a relatively fixed unknown voltage, and $V_2$ the reference voltage caused to vary in accordance with a known function from a value below that of $V_1$ up to equality with $V_1$, and beyond the value of $V_1$. These two voltages $V_1$ and $V_2$ are added together by adder 51 and fed into an amplifier-limiter circuit 52. Selection of portions of the waveform output from the adder 51 can of course be effected if desired in the manners indicated above with reference to FIGS. 5 and 6. The amplifier-limiter circuit 52 may comprise a series of amplifier stages each followed by a limiter stage, the amplifier and limiter outputs being very broad band so as to produce as little distortion as possible. The bandwidth may for example extend from 10 kc. to 10 mc. The output of the amplifier-limiter circuit 52 is divided into two branches: one branch feeding high frequency discriminator 53, that is, a discriminator having its center frequency adjusted to a relatively high frequency; the other branch feeding low frequency discriminator 54, that is, a discriminator having its center frequency adjusted to a relatively low frequency. The output of each of the two discriminators is amplified at 55 and 56 and fed through cathode followers 57 and 58 into peak detectors 59 and 60. The two peak detector outputs are connected in push-pull through cathode followers 61 and 62 to actuate zero-center meter 63. In addition, a cathode-ray oscilloscope display can be obtained by tapping the two channels at the outputs of the cathode followers 57 and 58, feeding these two outputs to a subtracting circuit 64 designed to provide a positive voltage output for high frequency spikes and a negative voltage for low frequency spikes, and feeding the output of the subtractor to cathode-ray oscilloscope 66 through cathode follower 65.

In FIG. 9 there is provided a functional block diagram of a circuit adapted to utilize the foregoing voltage coincidence detecting circuits for the accurate encoding of the value of an unknown voltage in digital terms. In order to obtain a basic reference for the circuit, a first R.F. oscillator 101 of frequency $f_1$ is stabilized in voltage by the standard voltage source 102. Stabilization of the oscillator output is obtained by feeding the $f_1$ signal into variable gain amplifier 103, while controlling the gain of the amplifier by the output of voltage comparator 104 whose inputs are from the standard voltage source 102 and the output of the amplifier 103. Thus, comparator 104 functions to control the output of amplifier 103, to obtain a constant voltage of frequency $f_1$ referenced in amplitude to the value of standard voltage 102. A similar output is provided referenced to the unknown voltage X obtained at 109, by feeding the output $f_1$ of oscillator 101 to variable gain amplifier 111, in turn controlled by the output of voltage comparator 110 whose inputs are from the unknown voltage source 109 and the output of amplifier 111. A third signal of frequency $f_2$ is obtained from R.F. oscillator 105, feeding variable gain amplifier 115, in turn controlled by a sawtooth oscillator 116, thereby providing an output from amplifier 115 of frequency $f_2$ and varying in amplitude with respect to time in accordance with a sawtooth function.

The reference signal output $f_1$ of amplifier 103 and the sawtooth output $f_2$ of amplifier 115 are jointly fed into a voltage equality detecting circuit as set forth in FIG. 3, and represented by the coupler 106, limiter 107 and coincidence detector 108 in FIG. 9. This circuit comprising units 106, 107, and 108 may of course be further refined in the manners suggested by FIGS. 5, 6, 8 and 10 if desired. In any event, coincidence detector 108 provides a sharp output pulse or other characteristic indication when the voltage of the sawtooth output of amplifier 115 crosses or passes through equality with the reference voltage output of amplifier 103. Similarly, the unknown voltage from 109 as embodied in the $f_1$ output of amplifier 111 and the sawtooth output $f_2$ of amplifier 115 are jointly fed into a second voltage equality detecting circuit, comprising coupler 112, limiter 113 and coincidence detector 114 or other refinements as suggested herein. This latter circuit is the same as the circuit 106, 107 and 108, and provides a sharp pulse output or other characteristic indication from coincidence detector 114 when the $f_2$ sawtooth output of amplifier 115 crosses or passes through equality with the $f_1$ output of amplifier 111 representative of the unknown voltage X from 109.

The difference in time between a coincidence output from detector 108, and such an output from detector 114 is of course a measure of the relative voltage value between the standard voltage and the unknown voltage X. However, the measure is only approximate, and is not an accurate absolute measure. In order to obtain an absolute and accurate digitally encoded measure of the unknown voltage X, the reference output of detector 108 is utilized to standardize and stabilize the slope of the sawtooth output of sawtooth oscillator 116. With a known stable sawtooth slope, the time interval between initiation of the sawtooth waveform and equality between the outputs of amplifiers 115 and 111 resulting in an output pulse from coincidence detector 114, becomes an accurate measure of the unknown voltage X. By utilizing a stable frequency pulse source and appropriate gating circuitry controlled first in time coincidence with initiation of the sawtooth waveform and then by a coincidence output from detector 114, the number of pulses passed by the gating circuit in this time interval is a measure of the unknown voltage X in digital terms.

With reference to the stabilization of the slope of the sawtooth output from the sawtooth oscillator circuit 116, it is first noted that each sawtooth wave generated by this unit is triggered by a pulse output from pulse generator 120. Thus the occurrence of a trigger pulse from generator 120 starts a cycle of measurement which will eventually produce a coincidence output pulse from detector 108. At the same time, the trigger pulse opens gate 122, which then passes a succession of pulses obtained as the output of a stable frequency counting oscillator 121 of frequency $F_1$. The number of counting pulses passed by gate 122 are registered in counter 123 until a predetermined count is reached, whereupon it applies a pulse to gating circuit 124, opening this gate to pass subsequent counting pulses to integrator 125, which thereby accumulates a charge in accordance with the number of counting pulses fed thereto. When the sawtooth envelope of the output of amplifier 115 reaches voltage equality with the output of amplifier 103, the sharp pulse output of coincidence detector 108 closes gate 122, clears counter 123, closes gate 124, and opens gate 126 which then passes the accumulated charge on integrator 125 to error storage circuit 127. A short time after opening, gate 126 automatically closes, and provides a discharge pulse to reset the integrator 125. The voltage thus stored in the error storage circuit operates on slope corrector circuit 128 to control the slope of the sawtooth waveforms issued from the oscillator circuit 116. It will thus be appreciated that when the sawtooth slope of this oscillator is at a prescribed angle, the charge accumulated in the integrator for each cycle has a value that results in an output from the slope corrector adapted to maintain that slope. However, should the sawtooth slope increase or decrease, there results respectively either a lower or higher charge accumulated in the integrator for each cycle, causing a corrective output from the slope corrector.

The foregoing circuits thus function to stabilize with extreme accuracy the slope of the sawtooth output of the oscillator circuit 116, and the consequent slope of the envelope of the output of amplifier 115.

In order to provide an accurate digitally encoded measure of the unknown voltage X obtained from source 109, the trigger output from pulse generator 120, which is utilized to initiate a sawtooth cycle from the oscillator circuit 116, is simultaneously applied to gate 130 to open the same. Gating circuit 130 then passes the counting pulses obtained from counting oscillator 121 to counter 131. When the voltage output of sawtooth oscillator controlled amplifier 115 obtains equality with the voltage output from amplifier 111 as controlled by and representative of the unknown voltage X, a sharp output pulse is obtained from coincidence detector 114. This output pulse from coincidence detector 114 closes gate 130 to stop any additional counting pulses from reaching counter 131, and opens gate 132 to pass the accumulated count stored in counter 131 to transmitter 133. A short time thereafter, gate 132 automatically closes, and in so doing issues a signal fed back to counter 131 to clear it of the existing count, leaving the circuit in readiness for the next cycle of operation in response to the next trigger pulse issued from pulse generator 120.

Thus, the combination of signals controlled by the stabilized sawtooth oscillator circuit 116 and the standard voltage circuit 102 are utilized to feed back a corrective signal to maintain the slope of the output of said oscillator 116 as a preselected value. The combination of the thus stabilized signal controlled by the stabilized sawtooth oscillator 116 and the signal controlled by the unknown voltage X are utilized to ascertain the exact value of voltage X, by obtaining a clear and sharp output denotative of equality between the signal controlled by sawtooth oscillator 116 and the unknown voltage controlled signal. The stability and accuracy of the system is of course thus derived from the standard voltage source 102.

As herein described, the comparison of two signals, such as the voltages $V_1$ and $V_2$, or their counterparts in FIG. 9, is always considered to be with respect to A.C. signals, because the principles utilized in this invention are dependent upon comparisons of A.C. signals. Obviously however, reference to A.C. signals herein and in the appended claims contemplates an original D.C. signal converted to an A.C. signal, since it would be readily apparent to anyone skilled in the art that a D.C. signal can be represented in terms of an A.C. counterpart by any of numerous techniques known in the art.

Having thus described several specific embodiments of the present invention, it is understood that these are intended merely as exemplary of the invention to enable a complete understanding thereof, and that numerous variations and modifications will be apparent to those skilled in the art. Accordingly, the invention is not limited to the presently disclosed specific systems and circuits, but such modifications and variations thereof as are embraced by the spirit and scope of the appended claims are contemplated as coming within the purview of the present invention.

What is claimed is:

1. A system for determining the voltage value of an unknown A.C. signal comprising means for generating a reference A.C. signal of a different frequency from the unknown signal, means for varying the voltage of the reference signal in accordance with a prescribed function which is adapted to cause the voltage of said reference signal to pass through a value equal to the voltage of the unknown signal, means for combining the unknown and varying voltage reference signals, and means for detecting the rate of change of phase of the resultant signal.

2. A system as set forth in claim 1, and further including means for limiting the amplitude of the resultant signal prior to said detecting means.

3. A system as set forth in claim 1 and further including an amplifier circuit and a limiter circuit in advance of said detecting means.

4. A system as set forth in claim 3, wherein the amplifier circuit includes control means for providing a larger amplification of the resultant signal when the two signals are substantially opposite in phase than otherwise.

5. A system as set forth in claim 4, wherein the amplifier circuit includes a variable $\mu$ tube amplifier, and means for isolating the beat frequency signal of the two signals and feeding said beat frequency signal to said amplifier tube to control the gain thereof.

6. A system as set forth in claim 4, and further including a gate circuit in advance of the amplifier and limiter circuits, and means for controlling said gate circuit to pass the resultant signal only when the two signals are substantially opposite in phase.

7. A system as set forth in claim 3, wherein the detecting means comprises a high frequency discriminator and a low frequency discriminator in parallel, and means responsive to the differential output between the two discriminators.

8. A system as set forth in claim 1, wherein said combining means includes a first channel in which one of said signals is combined with the other of said signals, a second channel in which a voltage fraction of said one signal is combined with said other signal, and means for combining the resultant of the combined signals from each of said channels.

9. A system as set forth in claim 8, wherein the last-mentioned means comprises an adding circuit.

10. A system as set forth in claim 8, wherein the last-mentioned means comprises a subtracting circuit.

11. A system as set forth in claim 8, wherein each channel includes means for limiting the amplitude of the resultant signal therein.

12. A system as set forth in claim 8, wherein each channel includes means for amplifying and means for limiting the resultant signal therein.

13. A system for determining the voltage value of an A.C. signal of unknown voltage, comprising means for generating an A.C. reference signal of a frequency different from that of the unknown signal, means for varying the voltage value of the reference signal in accordance with a prescribed function related to a starting reference time, means for combining the unknown and varying voltage reference signals, means for detecting the rate of change of phase of the resultant of the combined signals, and means for measuring the lapse of time between said starting reference time and a characteristic output of said detecting means indicative of voltage equality between said unknown and reference signals, whereby said lapse of time is a measure of said unknown voltage.

14. A system as set forth in claim 13, wherein said measuring means comprises a counter, a pulse source feeding said counter, a gating circuit interposed between said counter and pulse source, and triggering means, being coupled to said voltage varying means for keying said starting reference time and being coupled to said gating circuit for simultaneously opening the same pulses from said pulse source to said counter, said detecting means being coupled to said gating circuit for closing the same upon occurrence of said characteristic output, whereby the count accumulated by said counter denotes the value of the unknown signal voltage.

15. A system as set forth in claim 13, wherein said measuring means comprises a timing means and trigger means, said trigger means being coupled to said voltage varying means for keying said starting reference time and being coupled to said timing means for simultaneously initiating operation thereof, said detecting means being coupled to said timing means for stopping the timing means upon occurrence of said characteristic output, whereby the lapse of time measured by said timing means denotes the value of the unknown signal voltage.

16. A system for determining the voltage value of an A.C. signal of unknown voltage, comprising means for generating an A.C. reference signal of a frequency different from that of the unknown signal, means for varying the voltage value of the reference signal in accordance with a prescribed function related to a starting reference time, means for combining the two signals, the rate of change of phase of the resultant signal changing from a maximum of one sign to a maximum of opposite sign as said unknown and reference signals pass through a state of voltage equality, means for detecting said change of sign, and means for measuring the lapse of time between said starting reference time and said change of sign, whereby said lapse of time is a measure of said unknown voltage.

17. A system for determining the voltage value of an A.C. signal of unknown voltage comprising means for generating a first A.C. reference signal having a fixed and stable voltage, means for generating a second A.C. reference signal having a frequency different from the unknown and the first reference signals, means for varying the voltage value of the second reference signal in accordance with a prescribed function related to a starting reference time, means for combining the first and second reference signals to produce a first resultant signal, the rate of change of phase of said first resultant signal changing from a maximum of one sign to a maximum of opposite sign as said two reference signals pass through a state of voltage equality, first detecting means for detecting said change of sign, means for combining the unknown and second reference signals to produce a second resultant signal, the rate of change of phase of said second resultant signal changing from a maximum of one sign to a maximum of opposite sign as said unknown and second reference signals pass through a state of voltage equality, and second detecting means for detecting the last-mentioned change of sign, the time difference between occurrence of the two stated changes in sign being a measure of the difference in voltage value between the first reference signal and the unknown signal and hence a measure of the voltage value of the unknown signal.

18. A system as set forth in claim 17, wherein said means for varying the voltage of the second reference signal comprises a sawtooth generator for causing the voltage of said second reference signal to vary in sawtooth fashion, and further including a trigger means for keying the start of a sawtooth cycle of said generator and thereby establishing said starting reference time.

19. A system as set forth in claim 18, and further including means responsive to the first detecting means for stabilizing the slope of the sawtooth generator output, and means responsive to said trigger means and the second detecting means for measuring the lapse of time between said starting reference time and the occurrence of said change in sign for said second resultant signal.

20. A system as set forth in claim 17, and further including a trigger means for keying said starting reference time, means responsive to the first detecting means for stabilizing the function output of said voltage varying means, and means responsive to said trigger means and the second detecting means for measuring the lapse of time between said starting reference time and the occurrence of said change in sign for said second resultant signal.

21. A system for determining the voltage value of an A.C. signal of unknown voltage comprising means for generating a first A.C. reference signal having a fixed and stable voltage, means for generating a second A.C. reference signal having a frequency different from the unknown and the first reference signals, means for varying the voltage value of the second reference signal in accordance with a prescribed function related to a starting reference time, means for combining the first and second reference signals to produce a first resultant signal, first detecting means for detecting the rate of change of phase of the resultant of the combined first and second reference signals providing a characteristic output indicative of voltage equality between said first and second reference signal, means for combining the unknown and second reference signals to produce a second resultant signal, and second detecting means for detecting the rate of change of phase of the resultant of the combined unknown and second reference signals providing a characteristic output indicative of voltage equality between said unknown and second reference signals, the time difference between occurrence of the two stated characteristic outputs being a measure of the difference in voltage value between the first reference signal and the unknown signal and hence a measure of the voltage value of the unknown signal.

22. A system for determining the voltage value of an A.C. signal of unknown voltage, comprising means for generating a first A.C. reference signal having a fixed and stable voltage, means for generating a second A.C. reference signal having a frequency different from the unknown and first reference signals, a sawtooth oscillator cooperating with the last-mentioned means for varying the voltage value of the second reference signal in accordance with a sawtooth function, a starting time reference trigger generator for cyclically triggering said oscillator to generate said sawtooth function, means for combining the first and second reference signals to produce a first resultant signal, the rate of change of phase of said first resultant signal changing from a maximum of one sign to a maximum of opposite sign as said two reference signals pass through a state of voltage equality, a first detecting means for detecting said change of sign, means for combining the unknown and second reference signals to produce a second resultant signal, the rate of change of phase of said second resultant signal changing from a maximum of one sign to a maximum of opposite sign as said unknown and second reference signals pass through a state of voltage equality, second detecting means for detecting the last-mentioned change of sign, a counting pulse generator, a circuit for stabilizing the slope of said sawtooth function comprising a gating circuit controlled by said trigger generator and said first detecting means to pass pulses from said counting pulse generator during the period from said starting reference time to occurrence of said change of sign of said first resultant signal, means for determining the number of counting pulses passed by said gating circuit in said period, and means responsive to the last-mentioned means and controlling said oscillator to change the output sawtooth slope of said oscillator in accordance with any deviation in said number of counting pulses passed from a prescribed number to provide a slope adapted to result in said prescribed number, and an output circuit comprising a second gating circuit controlled by said trigger generator and said second detecting means to pass pulses from said counting pulse generator during the period from said starting reference time to occurrence of said change of sign of said second resultant signal, and means for determining the number of counting pulses passed by said second gating circuit in the last-mentioned period, the number of counting pulses passed by said second gating circuit constituting a measure of the value of the unknown signal voltage.

23. A system as set forth in claim 22, wherein the frequency of the unknown signal and the first reference signal are the same.

24. A system as set forth in claim 22, and further including means for resetting both said means for determining the number of counting pulses passed by said two gating circuits following completion of their respective determinations in each cycle of operation of said sawtooth oscillator.

25. A system for determining the voltage value of an unknown signal, comprising means for generating a reference signal having a voltage varying in value in sawtooth fashion, starting time reference trigger generating means for triggering successive sawtooth cycles of said reference signal generating means, means for detecting the occurrence of equality between the voltage values of said reference and unknown signals, a counting pulse generating means, a gating means coupled with said trigger generating means and said detecting means for passing counting pulses from said counting pulse generating means between the occurrence of a trigger output from said trigger generating means and detection of equality between said voltage values by said detecting means, and means for determining the number of counting pulses passed by said gating means, said number of counting pulses passed thereby constituting a measure of the voltage of the unknown signal, and further including means for stabilizing the slope of the sawtooth reference voltage, comprising means for generating a second reference signal of stable voltage value, means for detecting the occurrence of voltage equality between the two reference signals, a second gating means coupled with said trigger generating means and the second-mentioned detecting means for passing counting pulses from said counting pulse generating means between the occurrence of a trigger output from said trigger generating means and detection of voltage equality of said two reference signals by the said second-mentioned detecting means, means for measuring the count of pulses thus passed by the second gating means, and means for varying the slope of sawtooth reference signal in accordance with any deviations of this measurement from a prescribed value.

26. A system as set forth in claim 25, and further including means for resetting said count determining means and said count measuring means following completion of their respective determinations in each cycle of operation of said sawtooth reference signal generating means.

27. A system as set forth in claim 1, wherein said detecting means is a coincidence detector including a positive peak discriminator and a negative peak discriminator.

28. A system as set forth in claim 3, wherein said detecting means is a coincidence detector including a positive peak discriminator and a negative peak discriminator.

References Cited by the Examiner
UNITED STATES PATENTS

| | | | |
|---|---|---|---|
| 2,517,805 | 8/1950 | Spindler | 324—83 |
| 2,558,100 | 6/1951 | Rambo | 324—82 |
| 2,791,746 | 5/1957 | Bowersox | 324—99 |
| 2,806,185 | 9/1957 | Oberman | 324—83 |
| 2,870,436 | 1/1959 | Kuder | 324—99 |
| 2,936,447 | 5/1960 | Kinkead | 324—99 |
| 2,970,262 | 1/1961 | Haase | 324—82 |
| 2,972,108 | 2/1961 | Stone | 324—77 |
| 2,993,170 | 7/1961 | Smith | 324—78 |
| 3,038,089 | 6/1962 | Kittrell et al. | 307—88.5 |
| 3,058,113 | 10/1962 | Wilson | 307—88.5 |

WALTER L. CARLSON, *Primary Examiner.*

ELI J. SAX, FREDERICK M. STRADER, *Examiners.*